(12) United States Patent
Birkbeck et al.

(10) Patent No.: US 9,253,360 B2
(45) Date of Patent: Feb. 2, 2016

(54) IMAGER

(75) Inventors: Aaron L. Birkbeck, Bonita, CA (US);
Anis Husain, San Diego, CA (US);
Eliseo Ranalli, Irvine, CA (US)

(73) Assignee: ZIVA CORPORATION, INC., San Diego, CA (US)

( * ) Notice: Subject to any disclaimer, the term of this patent is extended or adjusted under 35 U.S.C. 154(b) by 857 days.

(21) Appl. No.: 13/543,601

(22) Filed: Jul. 6, 2012

(65) Prior Publication Data

US 2013/0016179 A1 Jan. 17, 2013

Related U.S. Application Data

(60) Provisional application No. 61/508,252, filed on Jul. 15, 2011.

(51) Int. Cl.
| | | |
|---|---|---|
| *H04N 7/00* | (2011.01) | |
| *H04N 1/04* | (2006.01) | |
| *H04N 1/113* | (2006.01) | |
| *H04N 1/195* | (2006.01) | |
| *H04N 5/33* | (2006.01) | |

(52) U.S. Cl.
CPC ............ *H04N 1/0408* (2013.01); *H04N 1/113* (2013.01); *H04N 1/195* (2013.01); *H04N 5/332* (2013.01); *H04N 2201/0081* (2013.01); *H04N 2201/02493* (2013.01); *H04N 2201/02495* (2013.01)

(58) Field of Classification Search
None
See application file for complete search history.

(56) References Cited

U.S. PATENT DOCUMENTS

| 4,267,562 | A  | * | 5/1981  | Raimondi ....................... 348/144 |
| 8,441,535 | B2 | * | 5/2013  | Morin ........................... 348/148 |
| 2004/0207744 | A1 |   | 10/2004 | Bock |
| 2005/0128551 | A1 | * | 6/2005  | Yang ............................. 359/214 |
| 2009/0225189 | A1 | * | 9/2009  | Morin ......................... 348/229.1 |
| 2010/0111441 | A1 | * | 5/2010  | Xiong et al. .................. 382/275 |
| 2010/0134662 | A1 | * | 6/2010  | Bub .............................. 348/266 |
| 2011/0141441 | A1 | * | 6/2011  | Konno et al. ................... 353/69 |

OTHER PUBLICATIONS

Brown et al., MEMS-based handheld projection systems and a survey of applications, MOEMS and Miniaturized Systems X, Proc. SPIE—The International Society for Optical Engineering, 2011, vol. 7930, p. 79300F (14 pp.), San Francisco, CA.
Li et al., Single pixel optical imaging using a scanning MEMS mirror, J. Micromech. Microeng., 2011, vol. 21, Iss. 2, p. 025022 (9 pp.).

* cited by examiner

*Primary Examiner* — Kate Luo
(74) *Attorney, Agent, or Firm* — Anatoly S. Weiser, Esq.; TechLaw LLP

(57) ABSTRACT

Selected embodiments use a relatively small image detector and a scanning mirror to obtain effective performance of a larger image detector. An imager with folded optics captures images of different field positions of a field of view (FOV), and stitches the images together for a larger image of the FOV. The stitched image is processed to identify portions of interest within the larger image, for example, using a cuing algorithm. The portions of interest are scanned again to capture enhanced quality images using, for example, longer dwell time for enhanced contrast. Another image of the FOV or a part of the FOV is stitched together using the enhanced quality images.

4 Claims, 10 Drawing Sheets

IMAGER

CROSS-REFERENCE TO RELATED APPLICATIONS

The present application claims priority from U.S. Provisional Patent Application Ser. No. 61/508,252, entitled SMART MULTISPECTRAL IMAGER (SAMI), filed on 15 Jul. 2011, which is hereby incorporated by reference in its entirety as if fully set forth herein, including text, figures, claims, tables, and computer program listing appendices (if present), and all other matter in the Provisional Patent Application.

FIELD OF THE INVENTION

This document is related to the field of imaging and image processing.

BACKGROUND

Numerous increasing demands for situational awareness make desirable optical (including infrared) imaging techniques to gather information over large fields of view. Current wide field of view (WFOV) multispectral imaging solutions are expensive not only in the economic sense, but also in terms of size, weight, and power requirements (SWaP). For this reason, they may be prohibitive for extensive deployment in mote and man-portable applications. Large format infrared (IR) and short wave infrared (SWIR) imagers, in particular, may be very expensive, and may have high power consumption.

It is therefore desirable to provide wide field of view single- and multi-spectral imaging methods and systems that have lower costs, lower size, lower weight, and/or lower power consumption, without significant loss of performance.

SUMMARY

To address one or more of the needs described above and/or other needs, selected embodiments described in this document use small format array image detector and a small scanning mirror to obtain effective performance of a larger format array image detector. For example, a two-dimensional (2D), ±20° effective field of view (FOV), scanner may be made with a small image detector; the scanner may be a visible light and/or SWIR/IR micro-electro-mechanical system (MEMS) reflective scanner.

Enhanced sensitivity in critical/selected areas of the field of view may be provided by "smart scanning," whereby one or more areas of interest are selected by a cuing (selection) algorithm and/or by a user. The imager (scanner, optics, and/or processing circuitry) may then be configured to dither and to capture images with variable dwell times in the areas of interest.

After (or during) scanning to capture images of smaller areas (sub-images) by a small image detector, an image of a larger portion of the field of view (or the entire field of view) is constructed by combining (i.e., "stitching") the multiple sub-images obtained by the smaller image detector. In examples, some overlap between the adjacent smaller sub-images exists; the overlap may be sufficient to eliminate aliasing effects during reconstruction of the larger image. A signal processing algorithm may eliminate artifacts associated with the scanning and/or stitching processes. The signal processing algorithm may be such that the non-uniformities in the processed image are less than responsivity variations inherent to the small array image detector.

To improve the overall performance of the imager, selected areas may be under-sampled, other selected areas may be oversampled, dither and/or variable dwell time may be employed in selected areas, and the scan may be redirected to increase integration time based on cues in the image, based upon operator input, and/or based on other criteria. Thus, the sensitivity of the imager scan in selected areas (under-sampled, normally-sampled, or oversampled), may be varied in such areas, for example, based upon the length of time a user spends looking at a specific area of the image, based on a cuing algorithm (such as face or object recognition), based on user input, and/or based on other criteria.

In embodiments, two or more small array image detectors in different spectral band are used. The images in each individual spectral band can be made available (e.g., displayed) to the user separately. Additionally, or instead, a fused image can be provided to the user. The spectral bands may include visible, IR, and SWIR.

In embodiments, an imaging method includes scanning a scene occupying at least a part of a field of view to obtain a plurality of standard quality sub-images of the scene. Each standard quality sub-image of the plurality of standard quality sub-images may cover less than the scene, for example, less than $\frac{1}{4}$, $\frac{1}{20}$, or $\frac{1}{100}$ of the scene. The plurality of standard quality sub-images together covers or substantially covers the scene. The method also includes combining (stitching) the plurality of standard quality sub-images into a first stitched image of the scene. The step of scanning the scene is performed in a first spectral band using a scanner with folded optics.

In embodiments, an imager includes an optical subsystem and a processor subsystem. The optical subsystem includes at least one image detector, folded optics, a controllable scanning mechanism, a control input, and a data output. The controllable scanning mechanism is configured to direct light onto the at least one image detector through the folded optics. The light is incident on the controllable scanning mechanism from a range of field positions controllable by the signal at the control input. The at least one image detector is configured to capture captured sub-images in one or more spectral bands (e.g., visible, IR, SWIR), and output the captured sub-images through the data output. The processor subsystem includes a processor, a control interface circuit coupled to drive the control input, and an image reader interface circuit coupled to the data output to read the captured sub-images through the data output. In selected variants, the processor subsystem is configured to cause the optical subsystem to (1) scan, in a first spectral band of the one or more spectral bands, a scene occupying at least a part of a field of view to obtain a plurality of standard quality sub-images of the scene, each standard quality sub-image of the plurality of standard quality (which is lower in some regard, such as contrast, than enhanced quality) sub-images. The plurality of standard quality sub-images together covers or substantially covers the scene. Each of the standard quality sub-images covers less than the scene, for example, less than $\frac{1}{4}$, $\frac{1}{20}$, or $\frac{1}{100}$ of the scene. In the selected variants, the processor subsystem may be further configured to combine the plurality of standard quality sub-images into a first stitched image of the scene.

These and other features and aspects of selected embodiments not inconsistent with the present invention will be better understood with reference to the following description, drawings, and appended claims.

DETAILED DESCRIPTION

Figure 1:
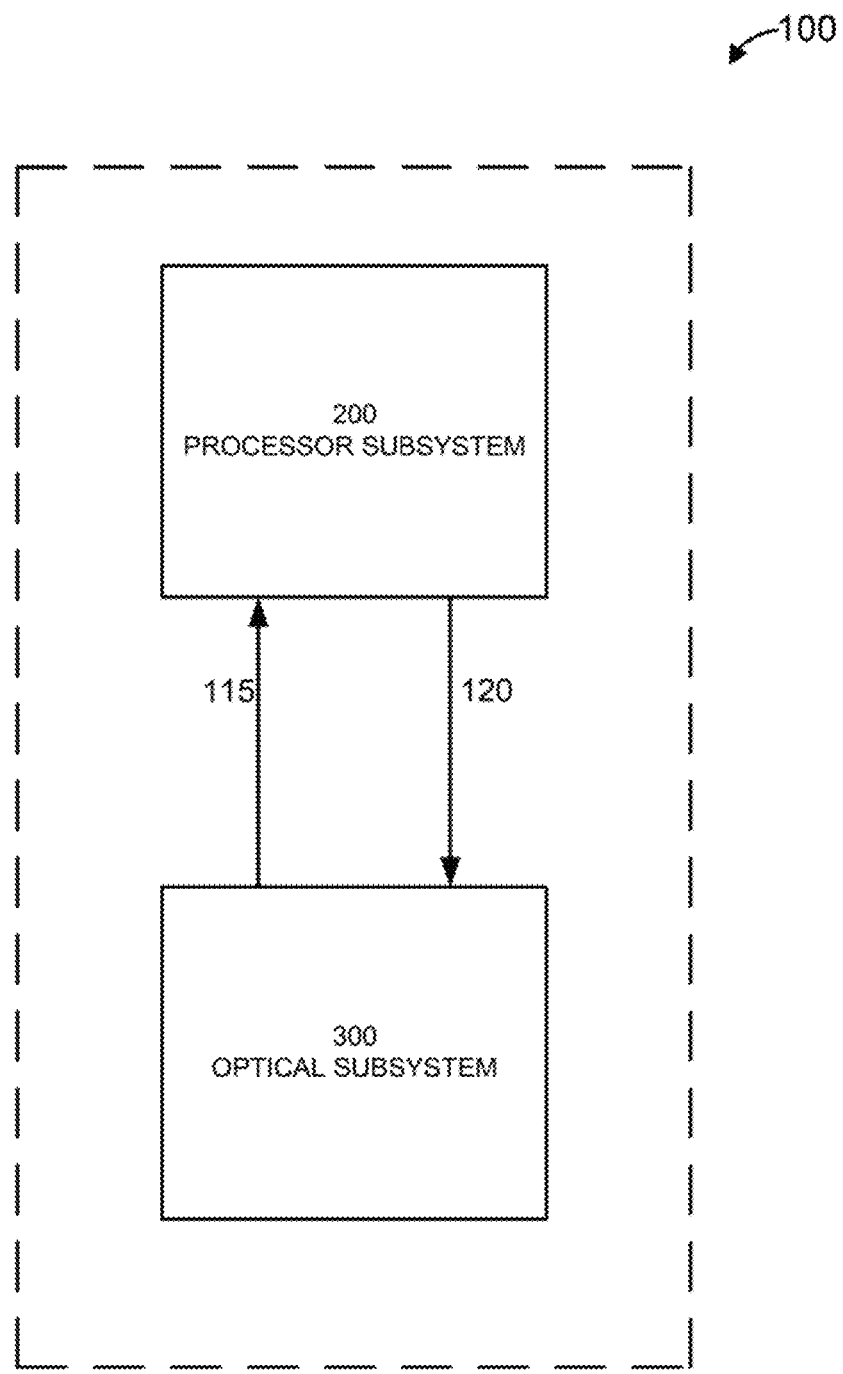
FIG. 1 is a high level block-diagram illustrating selected components of an imaging system configured in accordance with selected aspects described in this document.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions with their inflectional morphemes do not necessarily import an immediate or direct connection, but include within their meaning both direct/immediate connections and connections through mediate elements.

The expression "processing logic" should be understood as selected steps and decision blocks and/or hardware for implementing the selected steps and decision blocks. "Decision block" means a step in which a decision is made based on some condition, and process flow may be altered based on whether the condition is met or not met.

A "field position" is the specific direction of incidence of the rays received by optics (e.g., a scanning mirror) from a scene. Although line scanners are known, generally, a field position may vary in two dimensions. Thus, a scan of a scene involves image captures over field positions that may together cover the scene. The concept of field position is well understood in the imaging art.

Other and further explicit and implicit definitions and clarifications of definitions may be found throughout this document.

Reference will be made in detail to one or more embodiments (apparatus, methods, and/or articles of manufacture) that are illustrated in the accompanying drawings. Same reference numerals may be used in the drawings and this description to refer to the same apparatus elements and method steps. The drawings may be in a simplified form, not to scale, and may omit apparatus elements and method steps that can be added to the described systems and methods, while possibly including optional elements and/or steps.

FIG. 1 shows selected components of an imaging system 100 configured in accordance with selected aspects described in this document. The imaging system 100 includes a processor subsystem 200 and an optical subsystem 300. The processor subsystem 200 is configured to control the optical subsystem 300 over a connection 120, and read data from the optical subsystem 300 over a connection 115. Each of the connections 115 and 120 may be wired or wireless, in whole or in part. Each of the connections 115 and 120 may also be direct or indirect.

In operation, the processor subsystem 200 configures the optical subsystem 300 over the connection 120, and reads the output of the optical subsystem 300 (for example, the images captured by the optical subsystem 300) over the connection 115.

Although the connections 115 and 120 are shown with unidirectional arrows, this need not always be the case. In particular, the data and/or control signals may be sent over these connections in a bidirectional manner, for example, using a handshaking protocol. In variants, the connections 200 and 300 are implemented as a single bidirectional connection.

Figure 2:
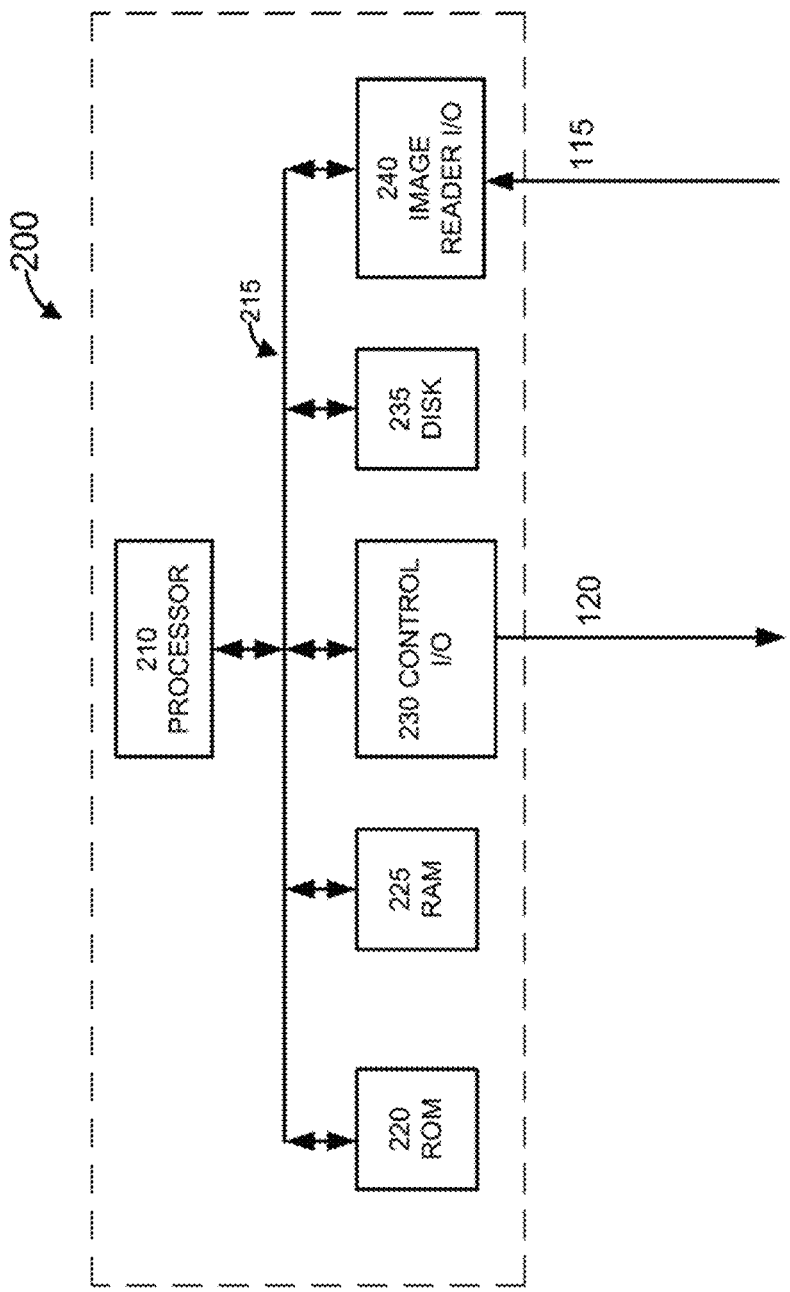
FIG. 2 illustrates selected components of a processor subsystem of the imaging system of FIG. 1.

FIG. 2 shows selected components of the processor subsystem 200. The processor subsystem 200 is configured to control the state of the scanner of the optical subsystem 300 (for example, the position/direction/orientation of the scanning mirror of the optical subsystem 300) through the connection 120, and to receive through the connection 115 the images captured by the image detector of the scanner.

In FIG. 2, a processor 210 executes computer-readable program code instructions to control the operation of the processor subsystem 200 and perform the method steps described throughout this document. The instructions may be stored in the processor 210 itself, in a read only memory (ROM) 220, in a random access memory (RAM) 225, and/or in disk storage 235. Generally, the program code instructions may be embodied in machine-readable storage media, such as hard drives, floppy diskettes, CD-ROMs, DVDs, flash memory and similar volatile or non-volatile devices that can store the instructions permanently or temporarily, in a non-transitory manner. The program code can also be transmitted over a transmission medium, for example, over electrical wiring or cabling, through optical fiber, wirelessly, or by any other form of physical transmission. The transmission can take place over a dedicated link between telecommunication devices, or through a wide- or local-area network, such as the Internet, an intranet, extranet, or any other kind of public or private network. In one embodiment, the program code is downloaded to the processor subsystem 200 through a network interface of the processor subsystem 200 (not shown).

The processor subsystem 200 also includes a control I/O circuit 230, which may be controlled by the processor 210 when the processor 210 executes the program code. The control I/O circuit 230 may be or may include analog and/or digital components, and may have an electrical output. The control I/O circuit 230 connects via the connection 120 to a corresponding control input of the scanner in the optical susbsystem 300, to set the state of the scanner of the optical subsystem 300. For example, the state of the output of the control I/O circuit 230 determines the field position or direction of the scanning mirror of the optical subsystem 300. The processor subsystem 200 additionally includes image reader I/O 240, which may be a digital interface circuit configured to allow the processor 210 to read information sent by the optical subsystem 300 over the connection 115, such as the images captured by the image detector of the optical subsystem 300.

A bus 215 connects together the different components of the processor subsystem 200.

Thus, the processor subsystem 200, under control of the instruction code executed by the processor 210, can be configured to (1) position the scanning mechanism of the optical subsystem 300 in a plurality of predetermined directions corresponding to different field position ranges, (2) read the images captured in each of the field position ranges, and then (3) process, store, display, and/or transmit the images to another system.

As a person skilled in the art would readily understand after perusal of this document, the boundaries of some or all of the various blocks, including the component blocks of the subsystem 200, are shown for convenience of description, and certain elements and/or functions may be logically related to multiple blocks and may be shown or described as belonging to more than one block.

FIGS. 3A through 3G illustrate selected perspective views of an embodiment of the optical subsystem 300. Note that some components may be missing in particular views, some components may be shown as transparent, and the perspectives of the different views may differ. Note further that the cone 395 is not a component, but a representation of the light received by the optical subsystem 300.

In these Figures, the light in the cone 395 is incident (through an aperture 302) on a micro-electro-mechanical system (MEMS) mirror 305. The mirror 305 reflects the light through a lens 308 towards a first mirror 310. The lens 308 may be, for example, a singlet lens, and may be installed in a threaded barrel 312 (FIG. 3B) for focus adjustment.

The first mirror 310 reflects the light once again, towards a second mirror 315.

Figure 3A:
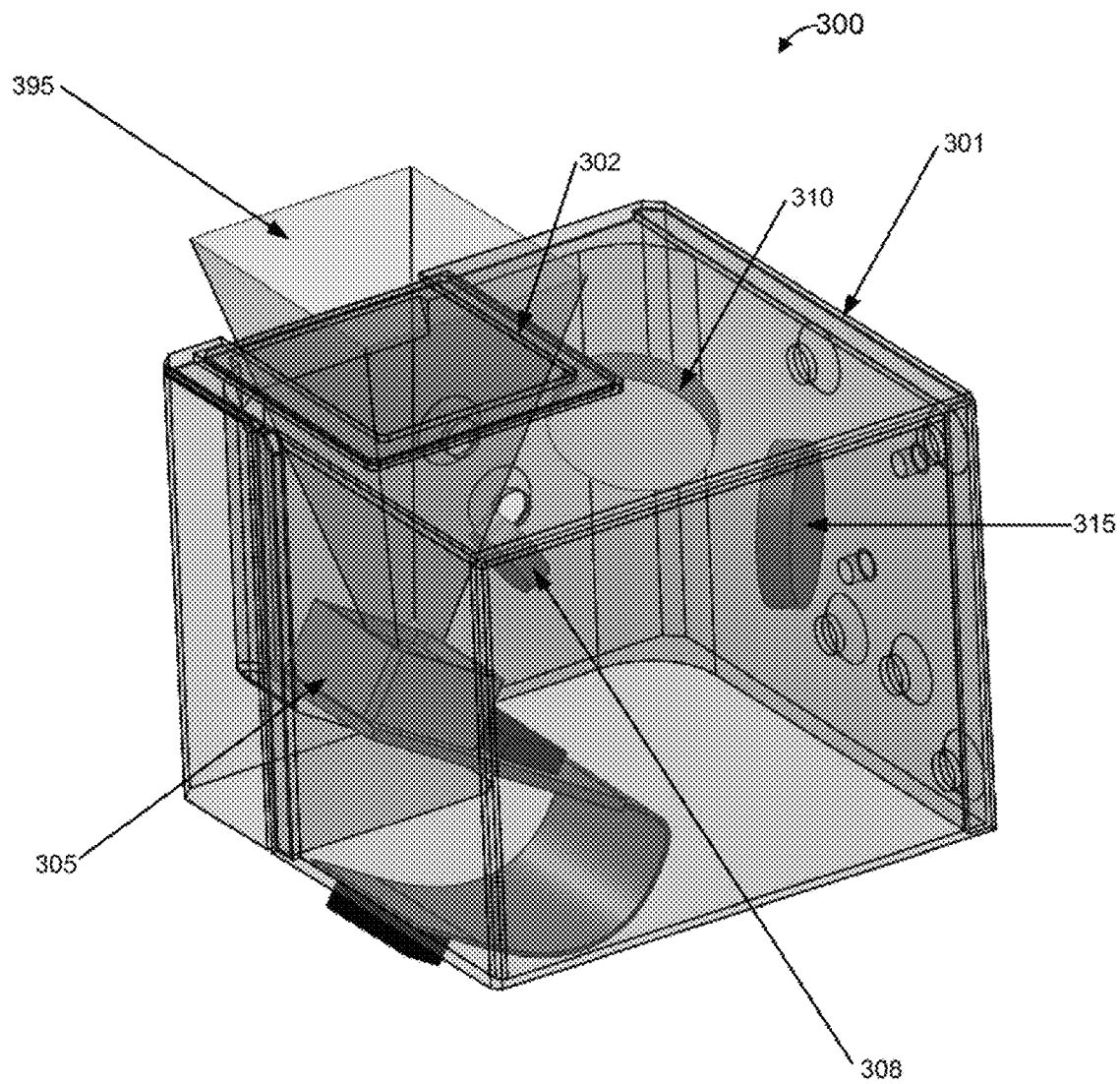
FIGS. 3A through 3G are different views illustrating selected components of an optical subsystem of the imaging system of FIGS. 1.
Figure 3B:
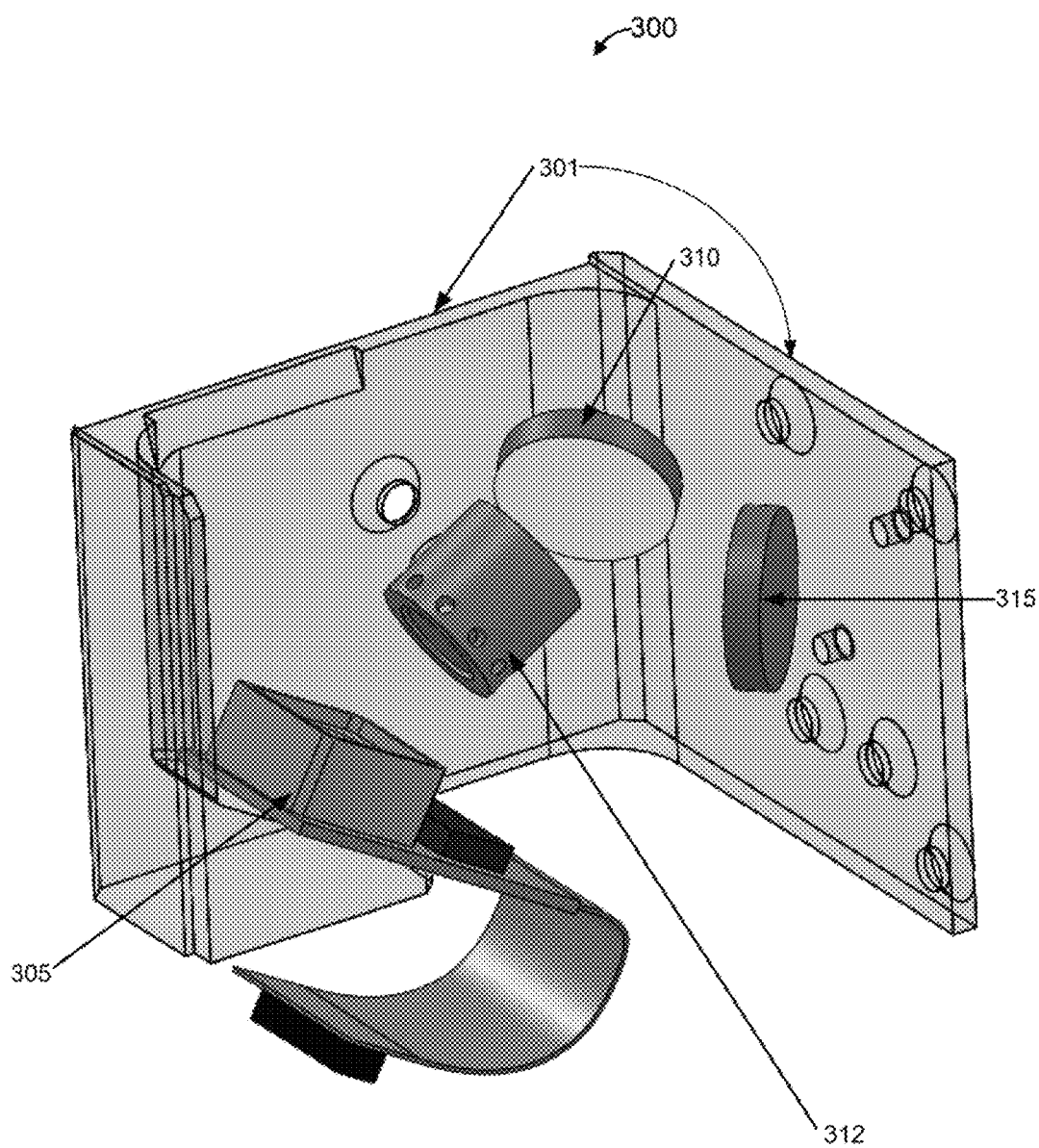
Figure 3C:
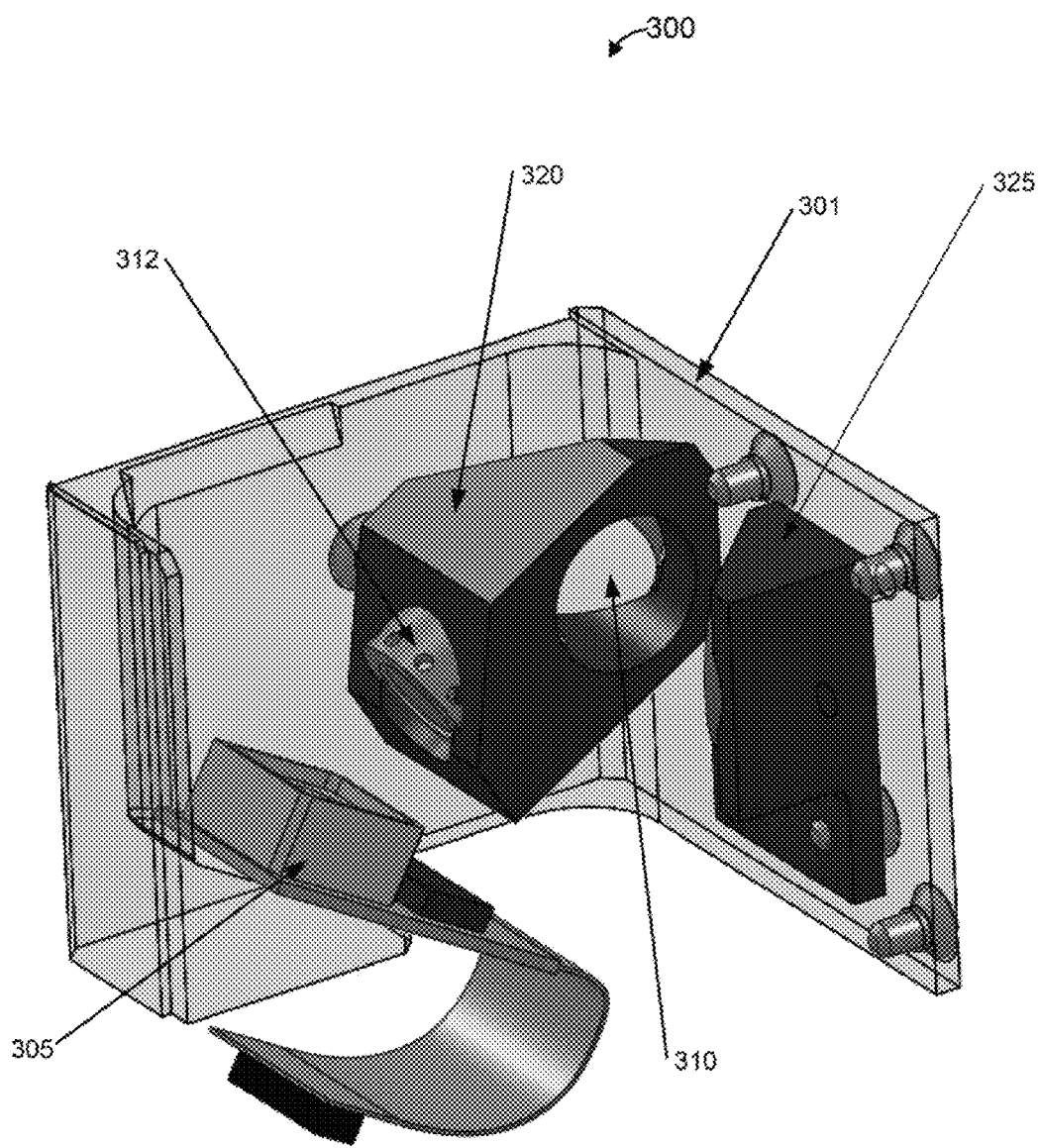
Figure 3D:
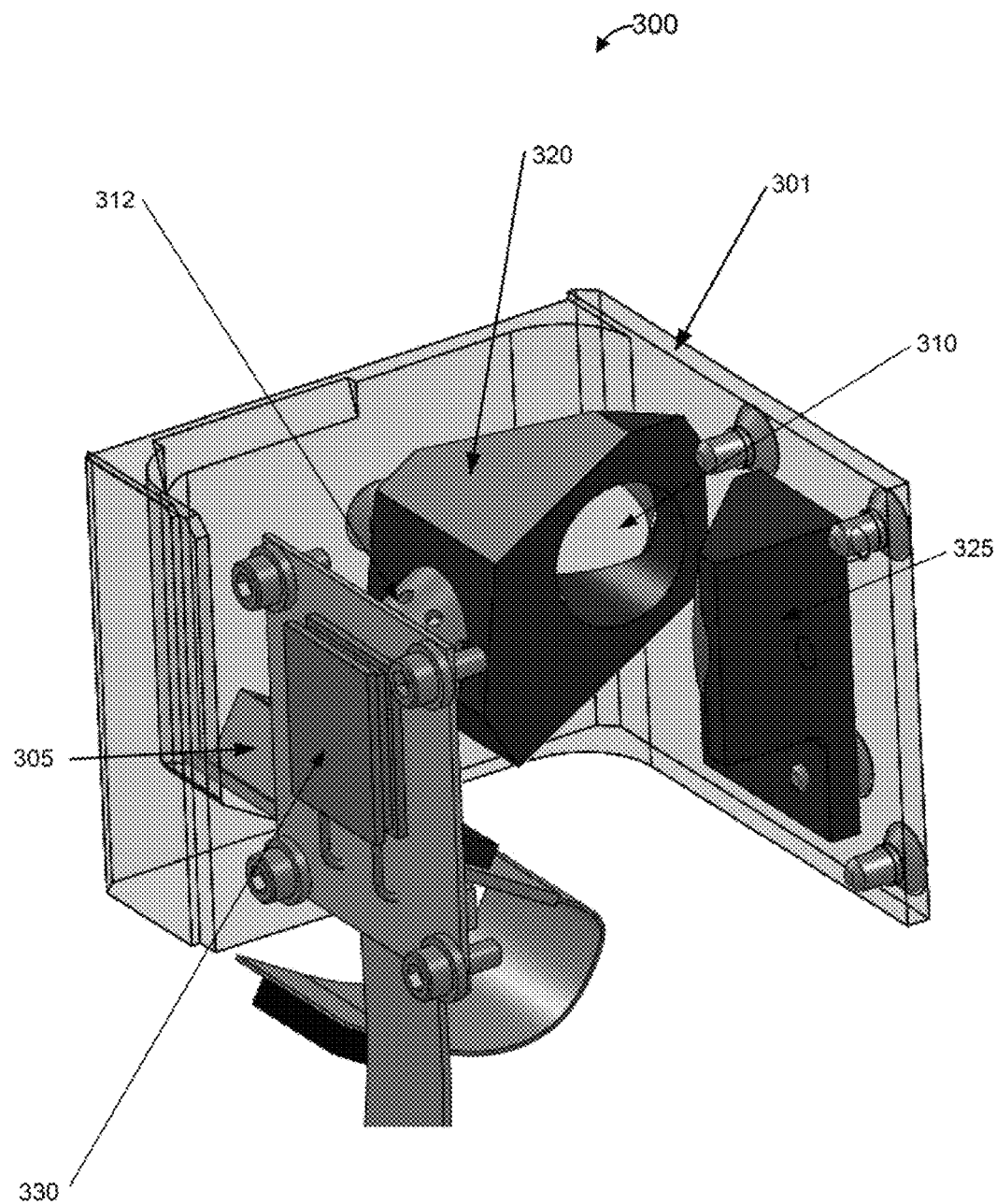

In variants, the first mirror 310, the lens 308, and the barrel 312 may be mounted in the same housing 320, as shown in the FIGS. 3C and 3D. The second mirror 315 may be mounted (e.g., bonded) onto a flexure member 325, facilitating alignment of the optics in the optical subsystem 300.

Figure 3E:
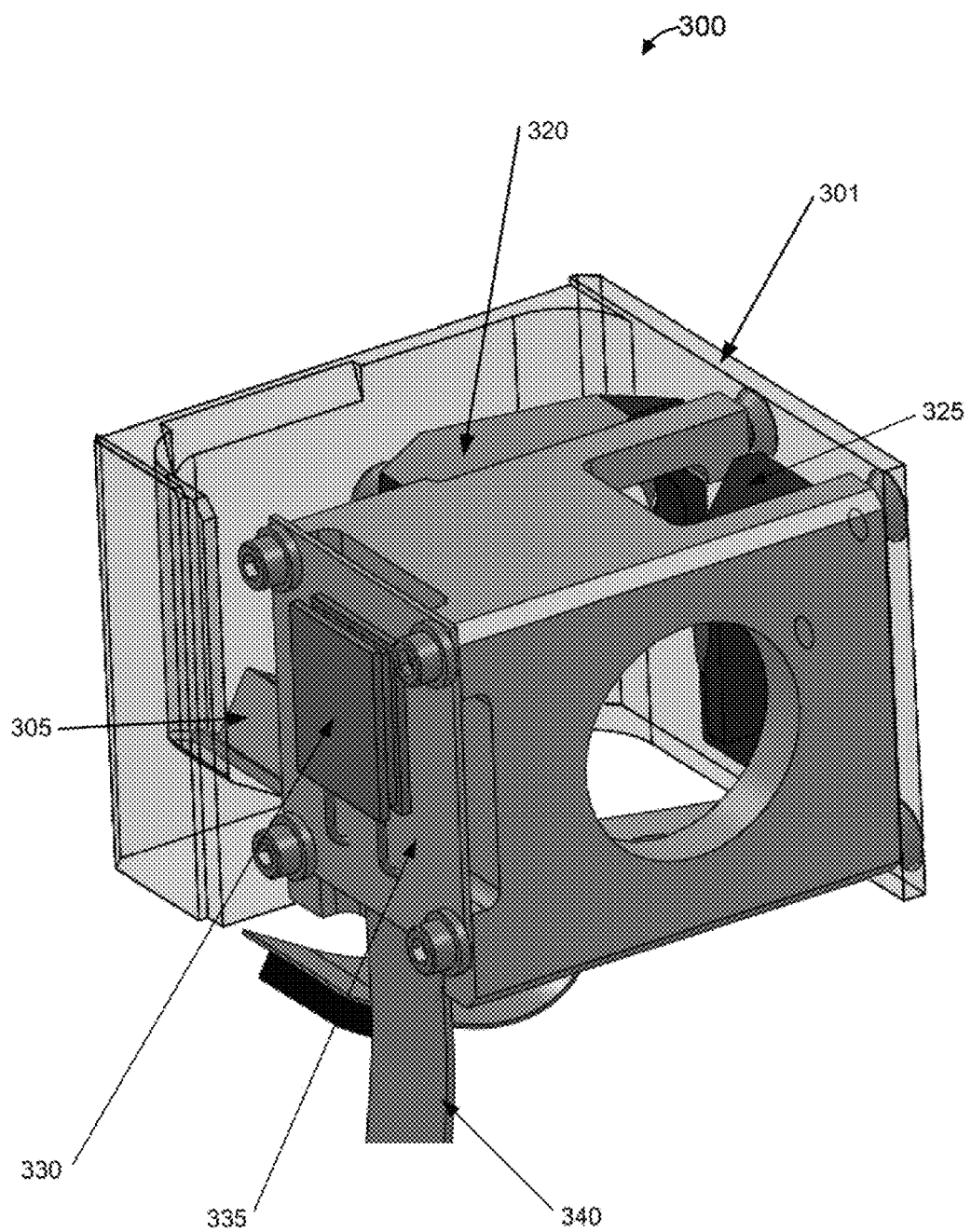

Continuing with the optical path, the light incident on the second mirror 315 is reflected onto an image sensor or detector 330. The detector 330 may be, for example, a charge coupled device (CCD). A configurable optical filter may be a part of detector 330, so that the detector 330 may be operable in different spectral bands; alternatively, a plurality of optical image detectors configured for operation in different spectral bands may be substituted for the detector 330. The detector 330 may be mounted on a frame 335, and the frame 335 may be attached to the housing 301 as shown in FIG. 3E; this configuration allows repeatable installations/reinstallations and detector replacements after the initial installation. The housing 301 encloses all or some of the other elements of the optical subsystem 300.

A ribbon cable 340 is part of the connection 115 that couples the output of the detector 330 to the image reader I/O 240 of the processor subsystem 200.

Figure 3F:
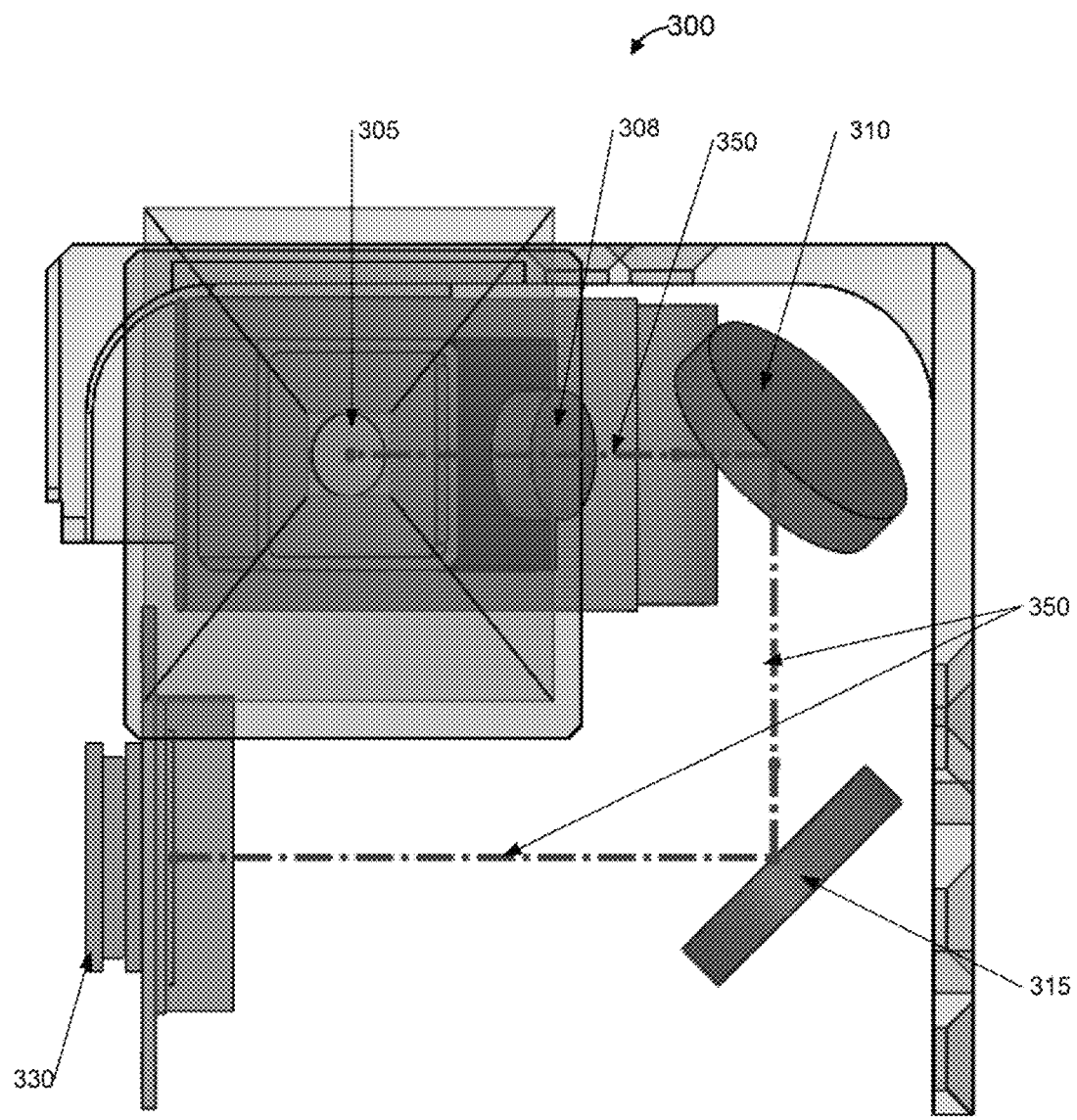
Figure 3G:
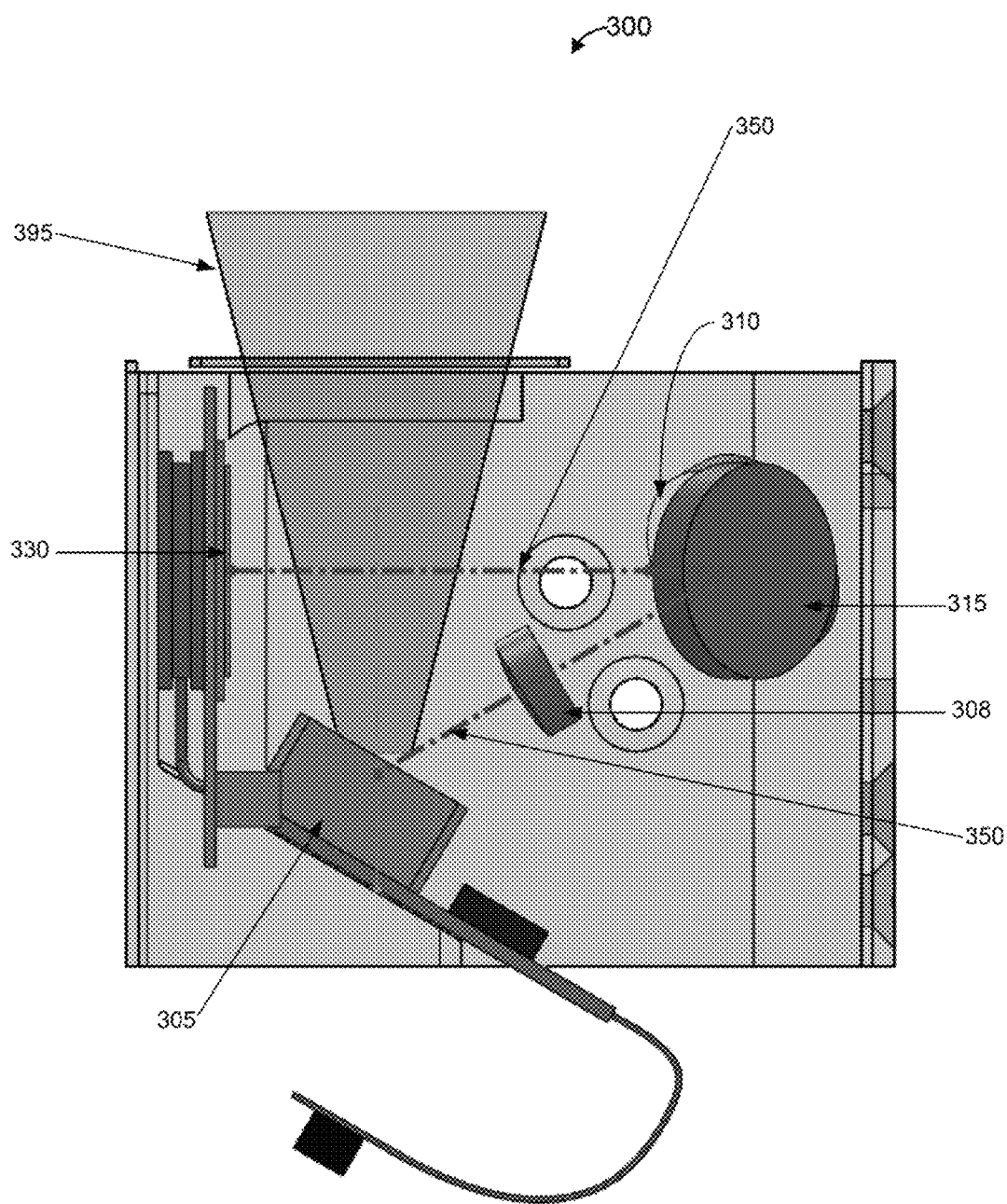

FIGS. 3F and 3G are simplified representations of the optical subsystem 300 with top and side views, respectively, showing the light path 350 within the optical subsystem 300. Note that the path is bent or "folded" by the mirrors 310 and 315, allowing a small physical size of the optical subsystem 300 relative to the Back Focal Length (BFL). This type of design is a "folded optical design" or simply "folded optics," meaning that at least two reflective components (mirrors) change the path of the light within the optical subsystem, to obtain a longer focal length than would otherwise be possible in the same physical size. In selected folded optical designs, the BFL is longer than each physical dimension of the design; in selected optical designs, the reflective elements change the light path by a combined angle of over 90 degrees, over 135 degrees, and 180 degrees or more.

A display device may be connected to or be a part of the processor subsystem 200, to display the images captured by the optical subsystem 300 in different field positions of the scanning mechanism (e.g., the MEMS mirror 305), processed/stitched images resulting from the captured images, and/or other information. Similarly, an output I/O module or a transmitter (wired or wireless) may be connected to or be a part of the processor subsystem 200, to transmit to an external display (or another computer system) the images captured by the optical subsystem 300 in different field positions of the scanning mechanism, processed pictures resulting from the captured images, and/or other information.

The processor subsystem 200 operates the optical subsystem 300 to scan a field of view by controlling the mirror 305 and to capture images with the detector 330. The resulting images may then be "stitched" to obtain a processed image of the field of view. Thus, the field of view can be captured using a smaller detector than would have been required to capture in a single captured image the same field of view with the same resolution. For example, a 640-by-512 pixel image may be stitched together from 5×4 images captured with a 128-by-128 detector, without substantial loss of resolution. The imaging system 100 can thus be made smaller, lighter, less expensive, and with lower power requirements. This is of particular interest with IR and/or SWIR imagers.

Note that the frame rate for obtaining an image of the entire field of view may be considerably lower with the smaller detector. In the above example (a 128-by-128 instead of a 640-by-512 detector), twenty images need to be captured with the smaller detector to cover the larger field of view. If the operation of the imager is sped up to compensate for the increased number of image captures, then a corresponding penalty in the contrast of the images may be incurred. In embodiments, intelligence is applied to the two-dimensional images to improve the contrast of the portions of the field of view that are of particular interest. A lower-contrast sweep of the field of view may be taken first, as is described above: the scanning mechanism is directed to different field positions and a plurality of images are captured by the imaging system 100. The processor subsystem 200 then (1) stitches the images together to obtain a lower contrast field of view (FOV) image; (2) applies intelligence to the lower contrast FOV image to identify one or more areas of interest within the field of view; (3) directs the scanning mechanism to the identified areas of interest and performs additional scan of these areas, this time with a longer dwell in order to improve contrast; and (4) stitches the higher contrast images from the second scan together (and possibly in combination with some or all of the captured images from the first scan) to obtain an enhanced FOV image with higher contrast in the identified areas of interest.

Figure 4:
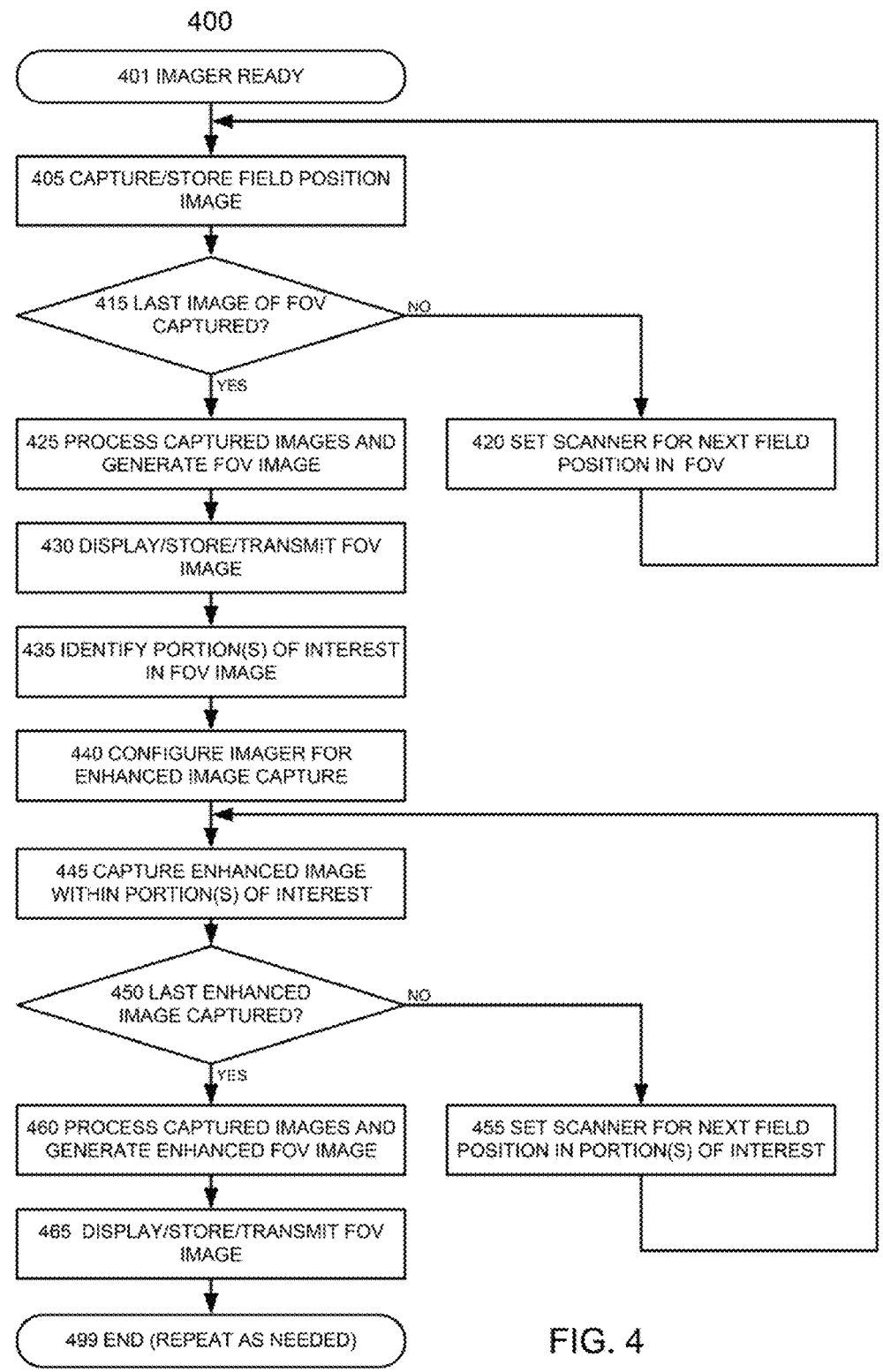
FIG. 4 illustrates selected steps and decision blocks of an imaging process.

FIG. 4 illustrates selected steps of an imaging process 400. At flow point 401, an imager (such as the imaging system 100) is configured, powered up, and ready to perform the process.

In step 405, the imager captures and stores an image of a field position corresponding to a portion of a field of view of the imager.

In decision block 415, the imager determines whether the last image of the field of view has been captured. For example, the imager may be configured to scan successively the field of view in a predetermined order, such as line by line horizontally or vertically. The imager may scan in different spectral bands, such as visible, IR, and SWIR bands; the imager may be configured to capture images in multiple spectral bands before proceeding to the next portion of the field of view, capture images of the entire field of view in one spectral band before advancing to a different spectral band; capture images in one spectral band of multiple (but fewer than all) portions of the field of view before proceeding to capture images of the same portions in a different spectral band, and then proceeding to do the same for a different set of multiple (but fewer than all) portions of the field of view; or intersperse image captures of different portions in different spectral bands in any predetermined or random order.

If the last image of the field of view has not been captured, process flow proceeds to step 420, in which the imager is configured for the next image capture. Here, a next portion of the field of view may be selected for capture, for example, by directing a scanning mirror of the imager to the next portion of the field of view; alternatively, a different spectral band may be selected for the next image capture of the same or a different portion of the field of view.

After the step 420, process flow returns to the step 405, to capture the next image.

Returning to the decision block 415, if the last image of the field of view has been captured, process flow advances to step 425. In this step, the images captured in the iterations of the loop of the steps 405, 420, and the decision block 415, are processed. Processing may include "stitching" the images into an FOV image of the field of view to obtain a stitched image of the field of view. The stitched image may be displayed, stored locally, and/or transmitted to a remote destination, in step 430.

The stitched image of the field of view may then be further processed in step 435, to identify one or more selected portions of interest in the stitched image. For example, the selected portion(s) of the FOV may be identified using a cuing algorithm. Face identification in a picture is an example of a cuing algorithm. A portion of the FOV of interest may also be identified by observing the direction of view of a user (to whom the stitched image is displayed), by reading an explicit input provided by the user, and/or otherwise. For example, a camera may be configured to observe the eyes of the user, and the resulting video may be analyzed to determine the portion to which the user's eyes are predominantly pointed. As another example, the user may select portion(s) of the stitched image through a pointing device (touch screen, mouse, or a similar/analogous device). As still another example, one or more objects of interest (e.g., people, tanks, other weapons) in the stitched image may be identified through pattern recognition and comparison with images pre-stored in an image database.

In step 440, the imager is configured to capture additional image(s) of the selected portion(s) of the field of view that correspond to the portions of the FOV identified in the step 435. As part of the step 440, the imager may be configured to capture enhanced images in one or more spectral bands. For example, here the imager may be now configured to dwell on each of the images longer than in the step 420, thus providing captured images with enhanced contrast.

Additionally, or instead, the imager may be configured to dither to increase the resolution of the selected portions. Using dithering, or a so-called "superresolution" technique, a series of images are taken with a sub-pixel shift between them. Suppose, for example, a focal plane has 10 micron×10 micron square pixels. If the optics have a resolution which exceeds this sampling (e.g., an Airy disk radius of four microns), then there is detail which cannot be sampled by the focal plane in a single exposure. But if five exposures are taken during a time interval over which the object is substantially stationary, each exposure with a shift of two microns, then an effective sampling of two microns in the dither direction may be obtained from the differences between the exposures.

Steps 445/455 and decision block 450 are analogous mutatis mutandis to the steps/block 405/420/415 described above. That is, in this loop the imager scans over the selected portions of the field of view to capture enhanced images of the selected portions. Some of the portions of the field of view are not scanned; indeed, often, only a small portion of the field of view is scanned here.

After the last enhanced image has been captured, as determined in the decision block 450, process flow continues to step 460. In this step, an enhanced stitched image is generated from the enhanced captured images from the step 445 and, optionally, some or all of the captured images from the step 405. For example, the captured enhanced images of the selected portions of the field of view may be stitched together to obtain an enhanced stitched image of the selected portions of the field of view or part of the selected portions of the field of view. As another example, the stitching is performed as in the step 435, but with the enhanced captured images being substituted for their corresponding non-enhanced captured images from the step 405, to obtain an enhanced stitched image of the selected portions of the field of view. As still another example, all or some of the enhanced captured images are stitched together with some of the non-enhanced captured images to obtain an enhanced stitched image of a part of the field of view that includes all or part of the selected portions of the field of view.

The enhanced stitched image may be displayed, stored locally, and/or transmitted to a remote destination, in step 465.

The imager and process features described throughout this document may be present individually, or in any combination or permutation, except where presence or absence of specific feature(s)/element(s)/limitation(s) is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art, whether volatile or non-volatile. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for image capture and processing. This was done for illustration purposes only and, therefore, the foregoing description is not necessarily intended to limit the spirit and scope of the invention(s) described. Neither the specific embodiments of the invention(s) as a whole, nor those of its or their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. An imaging method comprising steps of:
scanning a scene occupying at least a part of a field of view to obtain a plurality of standard quality sub-images of the scene, each standard quality sub-image of the plurality of standard quality sub-images covering less than the scene, the plurality or standard quality sub-images together covering the scene, wherein the step of scanning the scene is performed in a first spectral band with scanner comprising folded optic:
combining the plurality of standard quality sub-images into a first stitched image of the scene;
identifying at least one portion of interest in the scene from he first stitched image; and
scanning the at least one portion of interest to obtain a plurality of enhanced quality sub-images of the at least one portion of interest, each enhanced quality sub-image of the plurality of enhanced quality sub-images covering less than the scene, the plurality of enhanced quality sub-images together covering the at least one portion of interest, the step of scanning the at least one portion of interest being performed in response to the step of identifying, the step of scanning the at once portion of interest covering less than the scene, the step of scanning the at least one portion of interest being performed in the first spectral band with the scanner comprising folded optics;
combining the plurality of enhanced quality sub-images to obtain a second stitched image;
scanning at least a part of the scene in a second spectral band with the scanner comprising folded optics, to obtain a plurality of second band sub-images;
combining the plurality of second band sub-images into a third stitched image;
fusing the second stitched image and the third stitched image to obtain a fused image; and
at least one of storing the fused image, transmitting the fused image to an external system, and displaying the fused image.

2. An imaging method according to claim 1, wherein;
the first spectral band lies in visible part of electromagnetic spectrum; and
the second spectral band lies in infrared part of the electromagnetic spectrum.

3. An imager comprising:
an optical subsystem comprising at least one image detector, folded optics, a controllable scanning mechanism, a control input, and a data output, wherein the controllable scanning mechanism is configured to direct light onto the at least one image detector through the folded optics, the light being incident on the controllable scanning mechanism from a range of field positions controllable by the control input, and the at least one image detector is configured to capture captured sub-images in a first spectral hand and in a second spectral band different from the first spectral band and output the captured sub-images through the data output; and
a processor subsystem comprising a processor, a control interface circuit coupled to drive the control input, and an image reader interface circuit coupled to the data output to read the captured sub-images through the data output, the processor subsystem being configured to
cause the optical subsystem to scan in the first spectral band a scene occupying at least a part of a field of view to obtain a plurality of standard quality sub-images of the scene, each standard quality sub-image of the plurality of standard quality sub-images covering less than the scene, the plurality of standard quality sub-images together covering the scene;
combine the plurality of standard quality sub-images into a first stitched image of the scene;
identify at least one portion of interest in the scene from the first stitched image;
cause the optical subsystem to scan, after identifying the at least one portion, the at least one portion of interest to obtain a plurality of enhanced quality sub-images of the at least one portion of interest, each enhanced quality sub-image of the plurality of enhanced quality sub-images covering less than the scene, the plurality of enhanced quality sub-images together covering the at least one portion of interest, the plurality of enhanced quality sub-images together covering less than the scene;
combine the plurality of enhanced quality sub-images to obtain a second stitched image;
cause the optical subsystem to scan, in the second spectral band, at least a part of the scene, to obtain a plurality of second hand sub-images;
combine the plurality of second band sub-images into a third stitched image; and
fuse the second stitched image and the third stitched image to obtain a fused image.

4. An imager according to claim 3, wherein:
the first spectral band lies in visible part of electromagnetic spectrum; and
the second spectral band lies in infrared part of the electromagnetic spectrum.

* * * * *

UNITED STATES PATENT AND TRADEMARK OFFICE
CERTIFICATE OF CORRECTION

PATENT NO. : 9,253,360 B2  
APPLICATION NO. : 13/543601  
DATED : February 2, 2016  
INVENTOR(S) : Aaron L. Birckbeck et al.

Page 1 of 1

It is certified that error appears in the above-identified patent and that said Letters Patent is hereby corrected as shown below:

In the Claims

Column 9, line 42, cancel "he first" and replace the cancelled text with --the first--;

Column 9, line 51, cancel "once" and replace the cancelled text with --least one--;

Column 10, line 52, cancel "hand" and replace the cancelled text with --band--.

Signed and Sealed this
Third Day of May, 2016

Michelle K. Lee
*Director of the United States Patent and Trademark Office*